United States Patent [19]

Nix et al.

[11] Patent Number: 4,856,416

[45] Date of Patent: Aug. 15, 1989

[54] HYDRAULIC CYLINDER STRUCTURE

[75] Inventors: Richard A. Nix, Auburn Hills; Paul M. Regula, Sterling Heights, both of Mich.

[73] Assignee: Automotive Products plc, Warwickshire, England

[21] Appl. No.: 157,375

[22] Filed: Feb. 18, 1988

Related U.S. Application Data

[63] Continuation-in-part of Ser. No. 885,671, Jul. 15, 1986, abandoned.

[51] Int. Cl.⁴ .............................................. F16J 10/02
[52] U.S. Cl. ................................. 92/169.1; 29/527.2; 264/263; 264/274
[58] Field of Search ................. 92/169.1, 169.2, 169.3, 92/169.4, 171; 29/527.4; 264/263, 274; 60/533

[56] References Cited

U.S. PATENT DOCUMENTS

| | | | |
|---|---|---|---|
| 2,977,767 | 4/1961 | Randol | 92/171 X |
| 3,173,266 | 3/1965 | Shutt | 92/169 |
| 4,495,772 | 1/1985 | Furuta et al. | 92/171 X |

FOREIGN PATENT DOCUMENTS

| | | | |
|---|---|---|---|
| 549815 | 10/1956 | Italy | 92/171 |
| 39872 | 3/1980 | Japan | 92/171 |
| 158155 | 9/1982 | Japan | 92/171 |

*Primary Examiner*—Robert E. Garrett
*Assistant Examiner*—Mark A. Williamson
*Attorney, Agent, or Firm*—Krass & Young

[57] ABSTRACT

A hydraulic cylinder and the method of making such hydraulic cylinder of a tubular sleeve and a housing of dissimilar material cast or molded around the sleeve. The sleeve is provided at least at one end with a portion projecting into the material of the housing, such projection being preferably in the form of an annular bead with a corresponding internally disposed groove. The other end of the sleeve has an internally radially projecting flange projecting into the material of the housing, and the elastomeric O-ring is disposed at the junction between the internal surface of the flange and the surface of the sleeve bore to provide a seal for the pressure end of the cylinder.

15 Claims, 1 Drawing Sheet

HYDRAULIC CYLINDER STRUCTURE

CROSS-REFERENCE TO RELATED APPLICATION

This application is a continuation-in-part of U.S. patent application Ser. No. 885,671, filed July 15, 1986, now abandoned.

BACKGROUND OF THE INVENTION

The present invention relates to hydraulic cylinders and more particularly to a composite structure for hydraulic cylinders consisting essentially of a plastic housing molded around a metallic sleeve.

Hydraulic cylinders, such as hydraulic brake master cylinders and master and slave cylinders for hydraulic apparatus controlling the operation of motor vehicle mechanical clutches, have been made in the past entirely of impact and burst resistant plastics or, preferably, of a housing of plastic provided with an internal metallic tubular member or sleeve defining the bore of the cylinder in which a piston reciprocates. The cylinder housing, when it is molded of plastic, is provided with a tapered bore because of the requirement of providing internal cavities of a molding with a certain amount of draft to facilitate unmolding, as is well known in the art. The bore of the plastic housing is subsequently provided with a metallic sleeve made of steel, aluminum or other metal or metal alloy which provides a smooth and substantially cylindrical surface in which the piston, including the piston seal, is slidably disposed. Such a structure requires that means be provided for retaining the metallic sleeve in the bore of the plastic housing to prevent longitudinal motion of the sleeve relative to the housing and to ensure appropriate sealing from the ambient, principally at the pressure end of the cylinder. In addition, in view of progressive increasing clearance from one end of the cylinder to the other between the peripheral cylindrical surface of the metallic sleeve and the tapered, due to the required draft, internal surface of the plastic housing, additional seal means are provided between the metallic sleeve and the bore of the housing, not only at the pressure end of the cylinder, but also at the open end of the cylinder in order to prevent leakage of hydraulic fluid from the interior of the cylinder to the ambient, and a retainer is installed at the open end of the cylinder for preventing the piston from escaping from the cylinder bore.

Stringent sealing requirements are particularly prevalent in master cylinder structures. Hydraulic master cylinders are connected to a supply of hydraulic fluid in a hydraulic fluid reservoir, either formed integrally with the cylinder housing or made separate from the cylinder housing and connected thereto by an appropriate conduit. Hydraulic fluid is supplied from a reservoir to the master cylinder pressure chamber through appropriate ports through the wall of the cylinder such that loss of hydraulic fluid from the system may be compensated for and excess fluid, due to heat expansion for example, may be returned to the reservoir of fluid. The port or ports through the wall of the cylinder are appropriately masked by the piston seal at the beginning of the piston working stroke such as to cut off the reservoir from the cylinder pressure chamber during operation. Because the ports are formed through the wall of the cylinder housing and through the wall of the metallic sleeve or liner, and, because in prior art structures a narrow space exists between the peripheral surface of the sleeve or liner and the internal surface of the housing due to the fact that the internal bore in the housing is frusto-conical rather than perfectly cylindrical and the peripheral surface of the sleeve or liner is circularly cylindrical and of constant diameter from end to end, the entire narrow annular space between the bore of the cylinder and the peripheral surface or liner is filled with hydraulic fluid, thus requiring additional sealing means to be provided to prevent escape of hydraulic at the ends of the cylinder.

SUMMARY OF THE INVENTION

The present invention remedies the inconveniences and shortcomings of the prior art by providing a simple, low-cost structure for hydraulic cylinders, more particularly master cylinders, made of a plastic housing molded around a metallic sleeve or liner, as a result of the interior surface of the housing being in engagement with the outer peripheral surface of the sleeve or liner. The principal object of the invention is to provide a hydraulic cylinder molded of relatively low-cost and thin wall plastic forming a housing tightly and intimately surrounding a thin wall metallic sleeve or liner and requiring simple means for preventing the sleeve or liner from becoming detached from the plastic housing, and having a single seal preventing leakage of hydraulic fluid from the pressure chamber of the cylinder.

The many objects and advantages of the present invention will become apparent to those skilled in the art when the following description of the best mode contemplated at the present for practicing the invention is read in conjunction with the accompanying drawing, wherein:

DETAILED DESCRIPTION OF THE PREFERRED EMBODIMENTS

Figure 1:
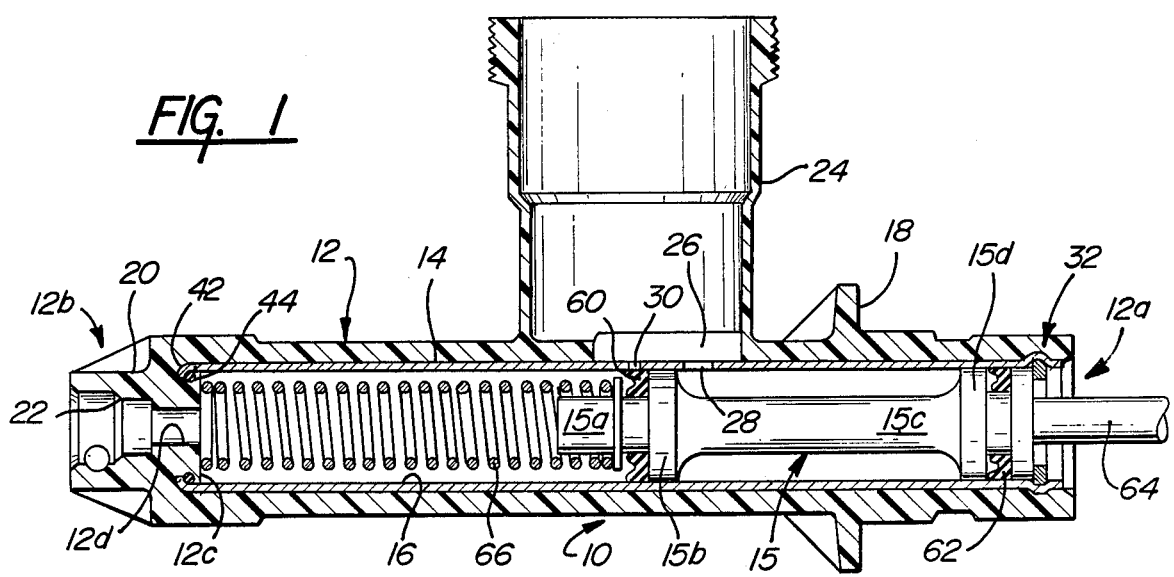
FIG. 1 is a longitudinal section through a composite hydraulic cylinder according to the invention.

Referring to the drawings and more particularly to FIG. 1, a hydraulic cylinder, for example a master cylinder 10, is illustrated as consisting essentially of a housing 12 cast or molded tightly and intimately over and around a thin wall metallic sleeve or liner 14 so as to leave no space or void between the interior surface of the housing and the exterior surface of the metallic sleeve. The housing 12 is preferably made of plastic such as ABS, phenolic resin, polyamide, PVC, and the like. Housing 12 has an open forward end 12a and a closed rearward end 12b defined by a rear end wall 12c defining a central discharge port 12d. A piston 15 is reciprocal in the bore 16 of the sleeve or liner 14. Piston 15 includes a nose portion 15a, a forward land portion 15b, a spool portion 15c, and a rearward land portion 15d. A seal 60 is positioned in a groove in forward land portion 15a, and a seal 62 is positioned in a groove in rearward land portion 15d. A piston rod 64 is suitably secured to piston 15 and a return spring 66 bears at one end against end wall 12c and is seated at its other end on piston nose portion 15a.

The cylinder housing 12 has an integrally molded mounting flange 18 proximate the rearward end thereof and a discharge fitting or boss 20 at the forward end thereof provided with a stepped bore 22 communicating with discharge port 12d in end wall 12c. A conduit, not shown, provided with an appropriate fitting, not shown, is fastened within fitting 20 so that hydraulic fluid can be transferred from the bore 16 of the cylinder 12 to a slave cylinder, not shown, when piston 15 is reciprocated within the bore 16 in the sleeve or liner 12.

In the structure illustrated, a reservoir of hydraulic fluid 24 is built-in or formed integral with the cylinder housing 12. The reservoir 24 is placed in communication with the internal bore 16 of the sleeve or liner 14 by means of an opening 26 at the bottom of the reservoir 24 and a pair of ports 28 and 30 through the wall of the sleeve or liner 14. After the housing 12 and the integral reservoir 24 have been intimately molded around the metallic sleeve or liner 14, and the assembly is removed from the mold, the port 28, or "recuperation" port, and the port 30 of "cut-off" port, are punched out or drilled, the punching tool or the drill being introduced through the opening 26 at the bottom of the reservoir 24 which, during molding of the housing 12 around the sleeve or liner 14 is formed by an appropriate core rod having its end in engagement with the outer surface of the sleeve or liner 14. The punching or drilling of the ports 28 and 30 is effected with a great care such as to prevent forming a burr at the edge of the ports within the bore 16 in the sleeve or liner 14. Electrical discharge (EDM) drilling may be used, as precision drilling by EDM provides burrless apertures and allows the formation of apertures of any shape such as square or rectangular for example, which cannot be obtained with a rotating cutting tool such as a drill.

Figure 6:
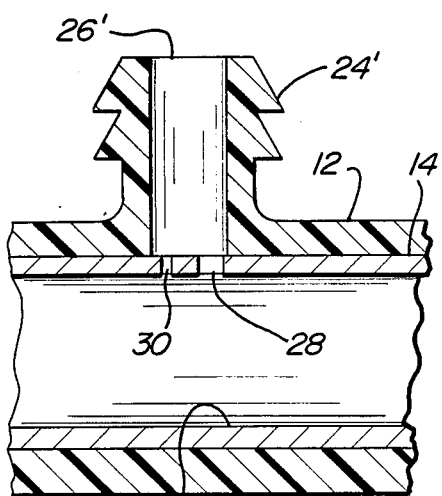
FIG. 6 is a partial view similar to FIG. 1 but showing a modification thereof.

In the alternate structure of FIG. 6, the reservoir of fluid, not shown, is remotely located and connected by means of a flexible tubing to a fitting 24' molded integral with the housing 12. The fitting 24' has a passageway 26', at the bottom of which are disposed the two ports 28 and 30, which may be punched or drilled through the passageway 26' after unmolding.

Figure 2:
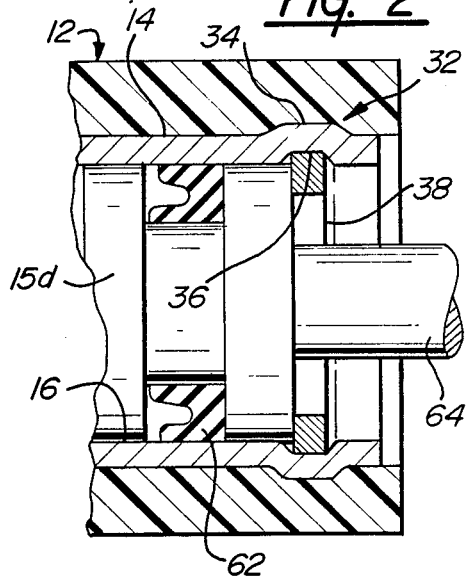
FIG. 2 is a partial view of FIG. 1, shown at an enlarged scale.

The sleeve or liner 14 is provided at its rearward end with a formed offset of upset portion generally designated at 32, best shown in FIG. 2. The offset of upset portion 32 forms an exteriorly extending annular bead 34 extending radially outwardly from the circular plane of the sleeve and defining a corresponding radially inwardly opening internal annular groove 36. The exteriorly extending annular bead 34 provides secure anchoring of the sleeve or liner 14 in the molded plastic housing 12 adjacent the open forward end 12a of the housing and prevents longitudinal motion of the sleeve or liner 14 relative to the housing 12 that may cause separation of the sleeve or liner 14 from within the housing 12. The internal annular groove 36 provides an arcuate recess in which is placed an annular retainer, for example, a split spring clip 38. Clip 38 extends radially into internal bore 16 of liner 14 so as to prevent piston 15 from escaping rearwardly from bore 16 under the action of the piston return spring 66 and so as to define the rearward, retracted position of the piston.

Figure 3:
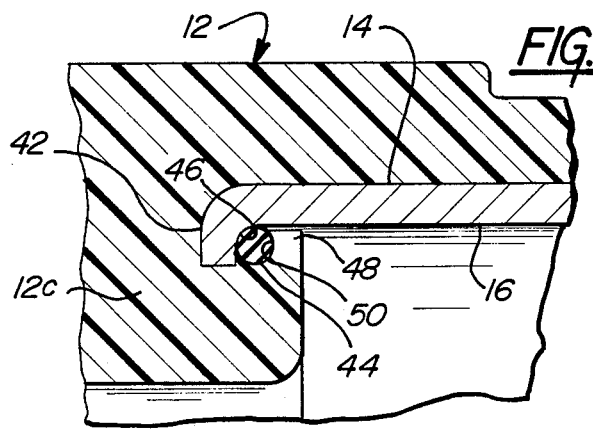
FIG. 3 is another partial view of FIG. 1, shown at an enlarged scale.

The other or forward end of the metallic sleeve or liner 14 is provided with an internally turned flange 42, best shown at FIG. 3, which provides appropriate anchoring of that end of the sleeve or liner 14 in the end wall 12c of the molded housing 12. An annular elastomeric O-ring 44 is placed against the internal curved junction surface 46 between the flange 42 and the main portion of the sleeve or liner 14 prior to molding the housing 12 around the sleeve or liner for sealing the pressure end of the cylinder 10. During molding of the plastic material around the sleeve or liner 14, an appropriate mandrel, or core rod, is placed within the bore 16 of the sleeve or liner 14, with its end an appropriate distance away from the flange 42 and the O-ring 44, so as to form a flanged rib 48, and a partially torodial wall 50 maintaining the O-ring in position.

Figure 4:
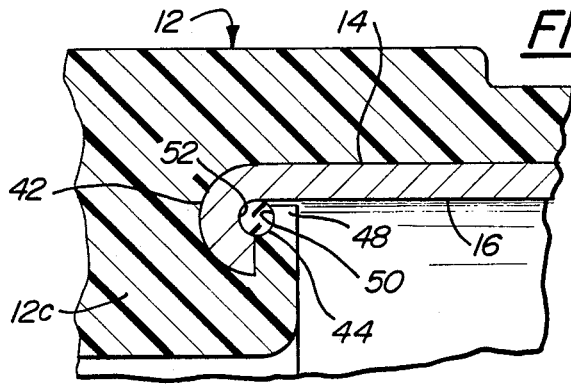
FIG. 4 is a modification of the structure illustrated at FIG. 3.

Alternatively, the flange 42, at the forward end of liner 14, as shown in FIG. 4, may be preformed in a curved semi-circular shape such as to partially surround the O-ring 44, as shown at 52, to provide better anchorage of the O-ring to prevent unilateral displacement of the O-ring when the sleeve or liner 14 is placed on its support mandrel or core rod in the mold prior to injecting the molten plastic which, after appropriate cooling and setting, forms the housing 12.

Figure 5:
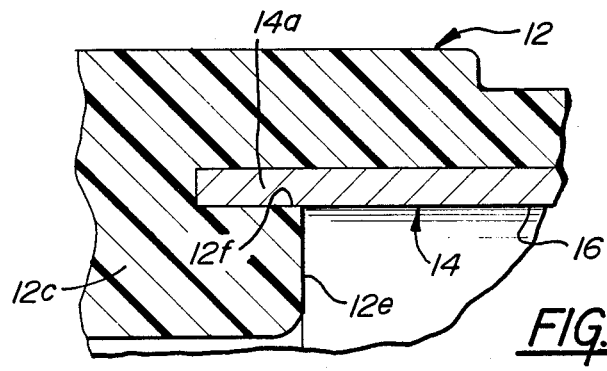
FIG. 5 is a further modification of the structure illustrated in FIG. 3.

As a further alternative, and as seen in FIG. 5, the forward annular end 14a of liner 14 may retain a simple tubular, cylindrical configuration and may be molded into cylinder housing end wall 12c with the rearward portion 12e of the end wall defining an annular groove 12f in which liner forward end 14a is firmly molded during the molding of the housing 12 around the liner 14.

Having thus described the present invention by way of an example of structure thereof well designed to accomplish the objects of the invention, modifications whereof will be apparent to those skilled in the art.

What is claimed as new is as follows:

1. A composite cylinder construction comprising:
   (A) a metallic sleeve of generally cylindrical configuration defining an elongated axial bore;
   (B) a non-metallic housing molded intimately around said sleeve and defining a closed housing end proximate the forward end of said sleeve defined by a housing end wall and an open housing end proximate the rearward end of said sleeve; and
   (C) a piston reciprocally mounted in said sleeve bore;
   (D) said metallic sleeve including annular anchoring means proximate the rearward end thereof lockingly and moldingly engaging the adjacent material of said housing to anchor said sleeve within said housing and presenting an annular radially inwardly opening internal groove proximate the rearward end thereof for receipt of retainer means.

2. A hydraulic cylinder construction according to claim 1 wherein:
   (E) said cylinder construction further includes further anchoring means proximate the forward end of said sleeve lockingly and moldingly securing said forward sleeve end to said housing.

3. A hydraulic cylinder construction according to claim 2 wherein:
   (F) said further anchoring means comprises an annular portion at the forward end of said sleeve moldingly embedded in said housing end wall.

4. A hydraulic cylinder construction according to claim 1 wherein:
   (E) said annular anchoring means comprises an annular upset portion proximate said rearward end of said sleeve.

5. A hydraulic cylinder construction according to claim 4 wherein:
  (F) said upset portion comprises an annular bead in said sleeve extending radially outwardly from the circular plane of said sleeve and defining an annular radially inwardly opening internal groove; and
  (G) said retainer means comprises an annular retainer fitted in said groove and extending radially into said bore to preclude rearward escape of said piston from said bore and define the rearward, retracted position of said piston.

6. A composite cylinder construction comprising:
  (A) a metallic sleeve of generally cylindrical configuration defining an elongated axial bore;
  (B) a non-metallic housing molded intimately around said sleeve and defining a closed housing end proximate the forward end of said sleeve defined by a housing end wall and an open housing end proximate the rearward end of said sleeve; and
  (C) a piston reciprocally mounted in said sleeve bore;
  (D) said metallic sleeve including anchoring means proximate the rearward end thereof lockingly and moldingly engaging the adjacent material of said housing to anchor said sleeve within said housing;
  (E) said metallic sleeve further including a radially inwardly extending annular flange portion proximate the forward end of sleeve moldingly embedded in said housing end wall to further anchor said sleeve within said housing.

7. A hydraulic cylinder construction according to claim 6 wherein:
  (H) said cylinder construction further includes an elastomeric O-ring disposed internally of said flange and at least partially embedded in said housing end wall.

8. A hydraulic cylinder construction comprising:
  (A) a metallic sleeve of generally cylindrical configuration defining an elongated axial bore;
  (B) a plastic housing molded intimately around said sleeve and defining an open housing end proximate the rearward end of said sleeve and a closed housing end wall proximate the forward end of said sleeve including an inner, rearward face defining the forward end of said bore and an outer, forward face defining the forward end of said housing;
  (C) a discharge port extending axially through said end wall from said inner, rearward face to said outer, forward face; and
  (D) A piston reciprocally mounted in said sleeve bore;
  (E) said rearward end of said sleeve including an annular upset portion formed in said sleeve and lockingly and moldingly embedded in the plastic material of said housing to anchor said sleeve within said housing;
  (F) said forward end of said sleeve including an annular end portion moldingly embedded in said housing end wall in surrounding relation to said discharge port to further anchor said sleeve within said housing with the forward end of said sleeve terminating in said end wall in rearwardly spaced relation to said outer, forward face of said end wall.

9. A hydraulic cylinder construction comprising:
  (A) a metallic sleeve of generally cylindrical configuration defining an elongated axial bore;
  (B) a plastic housing molded intimately around said sleeve and defining a closed housing end proximate the forward end of said sleeve defined by a housing end wall and an open housing end proximate the rearward end of said sleeve; and
  (C) a piston reciprocally mounted in said sleeve bore;
  (D) said rearward end of said sleeve including an annular upset portion formed in said sleeve and lockingly and moldingly embedded in the plastic material of said housing to anchor said sleeve within said housing;
  (E) said forward end of said sleeve including an annular end portion coacting with said housing end wall to further anchor said sleeve within said housing;
  (F) said annular upset portion comprising an annular external bead defining an annular radially inwardly opening internal groove; and
  (G) said cylinder construction further including an annular retainer fitted in said groove and extending radially into said bore to preclude rearward escape of said piston from said bore and define the rearward retracted position of said piston.

10. A hydraulic cylinder construction according to claim 9 wherein:
  (H) said annular end portion of said sleeve is moldingly embedded in said housing end wall.

11. A method of making a hydraulic cylinder assembly comprising the steps of:
  (A) providing an elongated tubular sleeve having a cylindrical internal bore defining the bore for the cylinder assembly for sliding receipt of the piston of the associated piston assembly;
  (B) providing a radially outwardly extending anchoring means at the rearward end of said sleeve; and
  (C) molding a housing in intimate encasing relation around said sleeve of a material dissimilar to the material of said sleeve and including a generally tubular main body portion concentrically and moldingly surrounding said sleeve and moldingly interlocking with said anchoring means of said sleeve to preclude longitudinal displacement of said sleeve relative to said housing and define a rearward open end of said hydraulic cylinder assembly for entry of the rod of the associated piston assembly, and an end wall portion having a forward end face spaced forwardly from the forward end of said sleeve, said end wall portion closing said sleeve at the forward end thereof to define a closed forward end of said hydraulic cylinder assembly and defining a central discharge port for said hydraulic cylinder assembly extending axially through said end wall portion.

12. A method of making a hydraulic cylinder assembly comprising the steps of:
  (A) providing an elongated tubular sleeve having a cylindrical internal bore defining the bore for the cylinder assembly for sliding receipt of the piston of the associated piston assembly;
  (B) forming in said sleeve at the rearward end thereof an outwardly projecting annular deformation defining an externally exposed annular bead and a corresponding internal annular groove; and
  (C) thereafter molding a housing in intimate encasing relation around said sleeve of a material dissimilar to the material of said sleeve and including a generally tubular main body portion concentrically and moldingly surrounding said sleeve and moldingly interlocking with said annular bead of said sleeve to preclude longitudinal displacement of said sleeve relative to said housing and define a rearward open end of said hydraulic cylinder assembly for entry of the rod of the associated piston assembly, and an end wall portion closing said sleeve at the forward end thereof to define a closed forward end of said hydraulic cylinder assembly.

13. A method according to claim 12 wherein:
(E) said method includes the further step of moldingly embedding an annular forward portion of said sleeve in said housing end wall.

14. A method according to claim 13 wherein:
(F) said sleeve annular forward portion comprises a radially inwardly extending annular flange molded into said housing end wall.

15. A method according to claim 14 wherein:
(G) said method includes the further step of disposing an elastomeric O-ring at the junction of said flange and the bore of said sleeve prior to molding said end wall therearound.

* * * * *